US007837157B2

(12) United States Patent
Linhart et al.

(10) Patent No.: US 7,837,157 B2
(45) Date of Patent: Nov. 23, 2010

(54) KINK PROTECTOR FOR A LINE

(75) Inventors: Georg Peter Linhart, Wöllstadt (DE); Christian Norbert Linhart, Langgöns (DE)

(73) Assignee: Truplast Kunststofftechnik GmbH, Langgons (DE)

( * ) Notice: Subject to any disclaimer, the term of this patent is extended or adjusted under 35 U.S.C. 154(b) by 118 days.

(21) Appl. No.: 12/283,998

(22) Filed: Sep. 17, 2008

(65) Prior Publication Data

US 2009/0078836 A1 Mar. 26, 2009

(30) Foreign Application Priority Data

Sep. 21, 2007 (DE) .................. 20 2007 013 313 U

(51) Int. Cl.
*F16B 15/00* (2006.01)

(52) U.S. Cl. .......................... 248/71; 248/52; 439/445; 439/448

(58) Field of Classification Search .................. 248/52, 248/71; 439/445, 447, 448
See application file for complete search history.

(56) References Cited

U.S. PATENT DOCUMENTS 1,402,860 A * 1/1922 Hoover ........................ 248/52
1,625,477 A * 4/1927 Leahy ......................... 248/52
2,022,785 A * 12/1935 Rollman ..................... 439/447
3,986,765 A * 10/1976 Shaffer et al. ............... 439/314
4,632,488 A * 12/1986 Long et al. .................. 439/452
4,857,008 A * 8/1989 Kee et al. .................... 439/352
4,941,689 A * 7/1990 Sjoberg ......................... 285/7
5,037,175 A * 8/1991 Weber ......................... 385/76
5,042,844 A * 8/1991 Iida et al. ....................... 285/7
6,354,635 B1 * 3/2002 Dyson et al. ................ 285/308
6,467,817 B1 * 10/2002 Rhyman ..................... 285/319
6,722,904 B2 4/2004 Linhart
6,843,678 B2 * 1/2005 DeWitt et al. ............... 439/445
2003/0062722 A1 * 4/2003 Linhart ....................... 285/319
2004/0219821 A1 * 11/2004 Makita et al. ............... 439/445

FOREIGN PATENT DOCUMENTS

DE 25 15 640 A1 10/1976
DE 31 01 558 A1 9/1982
DE 34 12 116 A1 10/1985
DE 90 01 547.9 U1 4/1990
DE 93 01 102.4 U1 3/1993
JP 06-137484 A 5/1994
JP 2004-138218 A 5/2004

* cited by examiner

*Primary Examiner*—Terrell Mckinnon
*Assistant Examiner*—Bradley H Duckworth
(74) *Attorney, Agent, or Firm*—Reising Ethington P.C.

(57) ABSTRACT

A kink protector for a line which is led outwardly through a wall opening in a connecting sleeve of a hose or a pipe. The kink protector has a mounting cap which encloses the line, and a support helix which is integral with the cap and surrounds the line and which is resilient in bending. An outlet stub is provided at the connecting sleeve and is connected with the wall opening and into which the mounting cap can be pushed with at least axial fixing of the line in mechanically positive and detenting manner for the line.

9 Claims, 3 Drawing Sheets

3
5
7
6
8
4
23
1

5
IV
7
6
4
2
1

VI
5
7
6
4
3
1

5
7

10
6
20
9
21
4
1
22
24
2
19

3

7
5
6
10
9
21
4
1
23

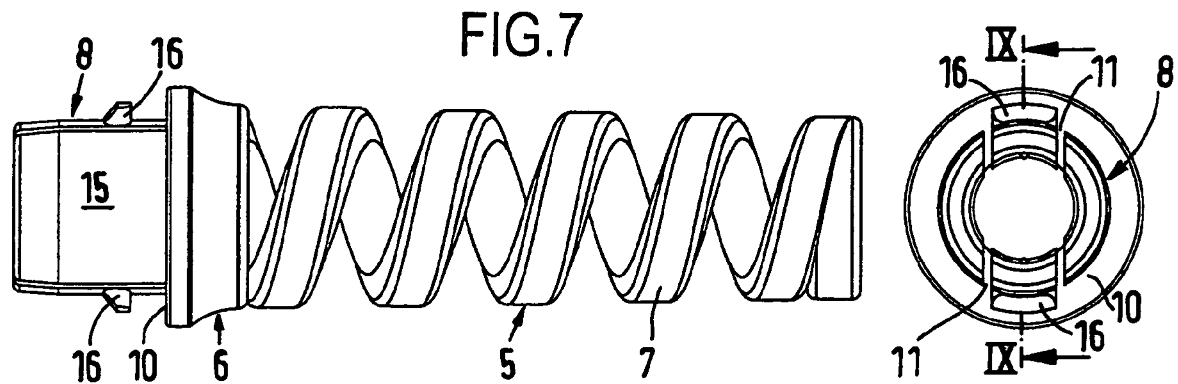
FIG.8
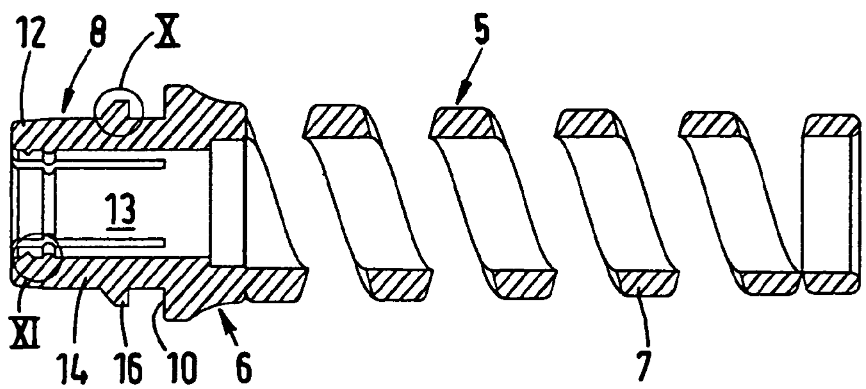
FIG.9
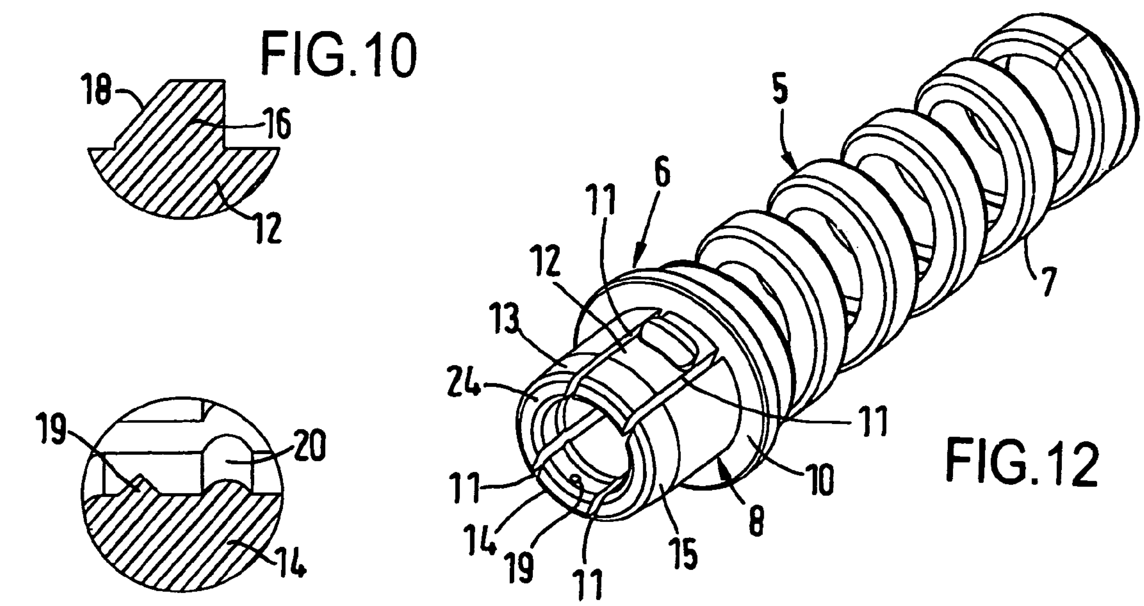

KINK PROTECTOR FOR A LINE

TECHNICAL FIELD

The invention relates to a kink protector for a line, which is led outwardly through a wall opening in a connecting sleeve of a hose or a pipe, particularly a vacuum cleaner hose.

The item here termed line is a cable enclosing electrical conductors or a hose conducting liquid or air.

STATE OF THE ART

In a known vacuum cleaner hose with a connecting sleeve, for example as disclosed in U.S. Pat. No. 6,722,904, electrical conductors are led outwardly through a wall opening. A kink protector for the electrical line is not, in that case, illustrated.

In a right-angled departure of a line from a connecting sleeve at a hose/pipe a line bent over outwardly at the outside will, without anti-kink protection, kink. In that event cables can break in the case of electrical conductors or hoses conducting liquid or air can be so narrowed in their cross-section that throughflow is reduced and in the extreme case completely interrupted.

Anti-kink or anti-bending arrangements substantially consisting of a fastening part and a resilient support helix, which is connected therewith and through which the line is led, have been proposed in various forms of embodiment for different applications for example as disclosed in DE 25 15 640 A1, GB 2091498, DE 34 12 116 A1, and DE 90 01 547 U1. In all these cases fastening of the anti-kink or anti-bending arrangements at the mounting location is carried out by threaded elements to be screwed together. As a result, production and assembly of the known anti-kink or anti-bending arrangements are costly, which is undesirable particularly with such mass-production parts.

It is desired to provide a kink protector for a line in the cases of use indicated in the introduction, particularly in conjunction with connecting sleeves for vacuum cleaner hoses, which protector is to be made in a simple manner without threaded elements and to be mounted without the function thereof being impaired.

SUMMARY OF THE DISCLOSURE

According to the invention the kink protector for a line, which is led outwardly through a wall opening in a connecting sleeve of a hose or a pipe, particularly a vacuum cleaner hose, is characterized by a mounting cap, which encloses the line, and a support helix which is integral with the cap and surrounds the line and which is resilient in bending, wherein provided at the connecting sleeve is an outlet stub for the line, which stub is connected with the wall opening and into which stub the mounting cap can be pushed with at least axial fixing of the line in mechanically positive and detenting manner.

The kink protector according to the invention is, after leading through of the line, simply pushed by its mounting cap into the correspondingly matched associated outlet stub of the connecting sleeve until detenting occurs, wherein the line is at the same time fixed within the mounting cap at least in axial direction. After the detenting process it is not possible to either axially displace the line in the kink protector or withdraw the kink protector by its mounting cap from the outlet stub without further measures. The kink protector thus fastened to the connecting sleeve ensures that the line cannot directly kink over at the connecting sleeve through an angle of 90°, but due to the effect of the support helix is led out of the connecting sleeve only in a curve. Cable breakages or cross-sectional constrictions of the hose are therefore prevented with certainty.

In continuation of the inventive concept the outlet stub is formed to have the shape of a section of a tube and has an outer annular end surface against which the mounting cap pushed into the outlet stub pipe by a clamping surface bears by a corresponding abutment surface. The end surface of the outlet stub and the abutment surface of the mounting cap limit or end the push-in travel, wherein the abutment surface terminates the outlet stub in outward direction.

Advantageously the clamping section of the mounting cap includes, starting from the abutment surface, at least two part elements, which are spaced apart by axially extending slots and of which at least one, when the line is pushed in, is resiliently bendable in outward direction and, when the clamping section is pushed into the outlet stub, is resiliently bendable in inward direction with clamping action on the line. In this simple manner during the insertion process not only the mounting cap and thus the anti-kink arrangement overall are fastened by detenting at the outlet stub, but at the same time the line is fixed in the mounting cap by clamping.

With advantage, a detenting of the mounting cap in the outlet stub can be produced, namely through at least one of the part elements having at the outside a detent lug associated with a detent depression in the outlet stub, into which the detent lug enters when the mounting cap bears by its abutment surface against the end surface of the outlet stub.

If in that case in addition to an axial fixing of the line in the mounting cap a rotational securing is desired at the same time, the arrangement can advantageously be such that the detent depression in the outlet stub is formed as a wall opening, which receives the detent lug in complementary manner, of the outlet stub so that the mounting cap is not only axially fixed in the outlet stub, but also secured against rotations of the mounting cap in the outlet stub.

If, however, only axial fixing is desired, the detent depression can be formed in the outlet stub as an annular groove receiving the detent lug so that the mounting cap is only axially fixed in the outlet stub and is not secured against rotations of the mounting cap in the outlet stub. In this connection the annular groove encircling the inner circumference of the outlet stub is not visible from the outside.

In addition to fixing of the line in the mounting cap by clamping action it can be provided that the mounting cap is, for prevention of rotation of the line in the mounting cap, provided with at least one pointed radial projection engaging the line and, for axial fixing of the line in the mounting cap, provided with an inwardly projecting annular rib. When the mounting cap is pushed into the outlet stub the at least one pointed radial projection and the annular rib engage in the circumferential surface of the line and in that case partially deform this inwardly so that a secure fixing of the line in the mounting cap is achieved.

In order to facilitate introduction of the mounting cap into the outlet stub it is of advantage if the clamping section of the mounting cap is conically formed at its free end. As a result, not only the introduction of the mounting cap, which has a slight oversize by comparison with the internal dimensions of the outlet stub, into the outline stub is facilitated, but at the same time the clamping pressure exerted by the mounting cap on the line which has been led through is increased.

The arrangement can in that case be such that the outlet stub has a substantially cylindrical inner wall surface, the diameter of which is greater than the diameter of the wall opening in the connecting sleeve so that there is formed between the wall opening and the inner wall surface an annular step on which is placed a sealing ring, which surrounds the line and which is loaded with pressing pressure by the end surface of the mounting cap fully pushed into the outlet stub and detented therein.

BRIEF DESCRIPTION OF THE DRAWINGS

Further details of the invention are explained in more detail in the following on the basis of drawings illustrating a preferred example of embodiment, in which:

FIG. 7 shows a side view of the unmounted kink protector without line;

FIG. 8 shows the view of the kink protector in correspondence with FIG. 7 in axial viewing direction on the mounting cap;

FIG. 9 shows the longitudinal section through the kink protector according to FIGS. 7 and 8 in correspondence with the section line IX-IX in FIG. 8;

FIG. 10 shows a sectional detail, illustrated to enlarged scale, in correspondence with the detail circle X in FIG. 9;

FIG. 11 shows a sectional detail, illustrated to enlarged scale, in correspondence with the detail circle XI in FIG. 9; and FIG. 12 shows a perspective outer view of the kink protector, which is illustrated in FIGS. 7 to 11, without line.

DETAILED DESCRIPTION OF THE PREFERRED EXAMPLE OF EMBODIMENT

Figure 1:
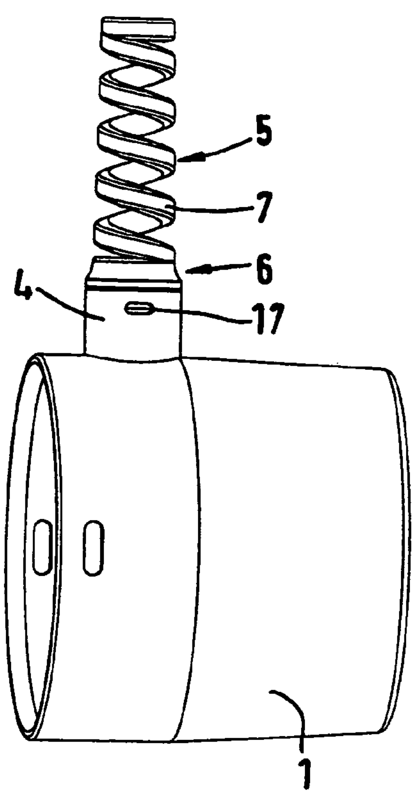
FIG. 1 shows a perspective outer view of a connecting sleeve with mounted kink protector, but without the line being shown.

A connecting sleeve 1, which is typical for vacuum cleaner hoses and in which is disposed at a wall opening 2 through which a line 3 located in the hose interior is led or to be led outwardly, is apparent from FIGS. 1 to 6. An integrally formed outlet stub 4 for the line 3 is connected with the wall opening 2 of the connecting sleeve 1, which is injection-molded from a thermoplastic plastics material.

The kink protector 5, which is to be fastened to the connecting sleeve 1, for the line 3 has a mounting cap 6 and a resilient support helix 7 integrally injection-molded therewith from a thermoplastic plastics material. The line 3 is to be led through the mounting cap 6 and the support helix 7 as evident from, for example, FIGS. 5 and 6, wherein a radial spacing as movement play is provided between the inner circumferential surface of the support helix and the outer circumferential surface of the line 3, whereas the mounting cap 6 tightly surrounds, by its substantially cylindrical inner circumferential surface, the outer circumferential surface of the line 3 when the kink protector 5 is mounted on the connecting sleeve 1 as shown in, for example, FIGS. 5 and 6.

The mounting cap 6 has a clamping section 8 which is intended for pushing into the outlet stub 4 and is described in more detail further below with respect to its construction in the example of embodiment. The outlet stub 4 is formed to be shaped like a section of a tube and has an outer annular end surface 9. Arranged at the mounting cap 6 is a corresponding abutment surface 10 which bears over an area against the end surface 9 when the clamping section 9 is pushed into the outlet stub 4.

In the example of embodiment the clamping section 8 is subdivided by two axially extending and mutually parallel slots 11, as best evident from FIGS. 8 and 12, into four mutually spaced apart elements 12 to 15. The slots 11 continue to the abutment surface 10. In that case the part elements 12 and 14 are resiliently bendable outwardly on pushing of the line 3 into the kink protector 5 and are resiliently bendable inwardly, with clamping action on the line 3, on pushing of the clamping section 8 into the outlet stub 4. The desired clamping action can be produced by two measures which can be present individually, but also conjunctively. On the one hand the inner diameter of the mounting cap 6 can be somewhat smaller than the outer diameter of the line 3 and on the other hand the inner diameter of the outlet stub 4 can be somewhat smaller than the outer diameter of the clamping section 8.

The part elements 12 and 14 each have on the exterior an integrally formed detent lug 16 associated with a respective detent depression 17 in the outlet stub 4, of which only one is visible in FIG. 1. The detent depressions 17 are, in the illustrated example of embodiment, formed as wall openings receiving the detent lugs 16 in complementary manner, whereby the mounting cap 6 is not only axially fixed in the outlet stub 4, but also secured against rotation in the outlet stub 4. The detent lugs 16 are provided with an inclined ramp surface 18 (FIG. 10) so as to facilitate detenting in the detent depressions 17. In the detented position illustrated in FIGS. 1 to 6 the mounting cap 6 bears by its abutment surface 10 over an area against the end surface 9 of the output stub 4.

In departure from the afore-described arrangement the detent lugs 16 can also be formed at the comparatively less resiliently bendable part elements 13 and 15 so as to achieve the described detenting.

The mounting cap 6 is provided at its inner circumferential surface with at least one pointed radial projection 19 which engages the line 3 and prevents rotations of the line in the mounting cap 6 when the kink protector is mounted. In the illustrated example the pointed radial projections 19 are disposed at the part elements 12 and 14 of the clamping section 8 of the mounting caps 6.

For axial fixing of the line 3 in the mounting cap 6 the latter is provided with an inwardly protruding integrally formed annular rib 20 which in the illustrated example is disposed adjacent to the pointed radial projections 19 in the front region—which is remote from the abutment surface 10—of the clamping section 8 and is interrupted by the axial slots 11 at four places. The radial projections 9 and the annular rib 20 are located in the outer region of the part elements 12 and 14, i.e. at places for which the possible spring travel of these part elements is greatest.

In order to facilitate introduction of the clamping section 8 of the mounting cap 6 into the outlet stub 4 the clamping section 8 is formed at its free end to be continuously conical over all part elements 12 to 15, as evident particularly from FIGS. 7, 9 and 12.

Figure 2:
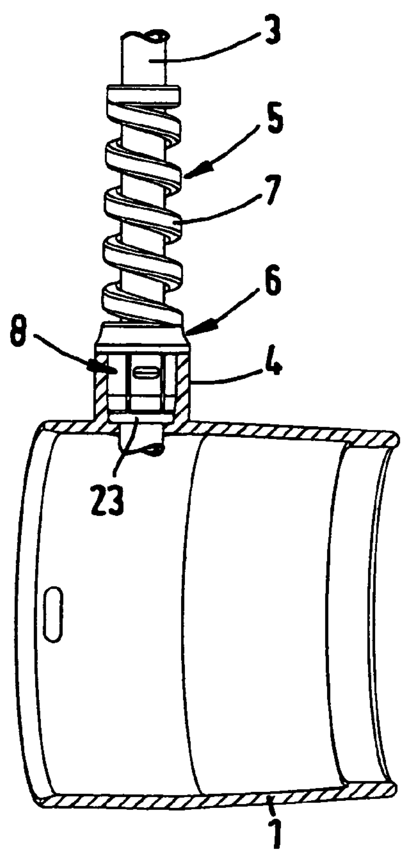
FIG. 2 shows a perspective view, which is similar to FIG. 1, of the connecting sleeve with a mounted kink protector and line illustrated broken away and not broken away respectively, with the connecting sleeve illustrated in longitudinal section.
Figure 3:
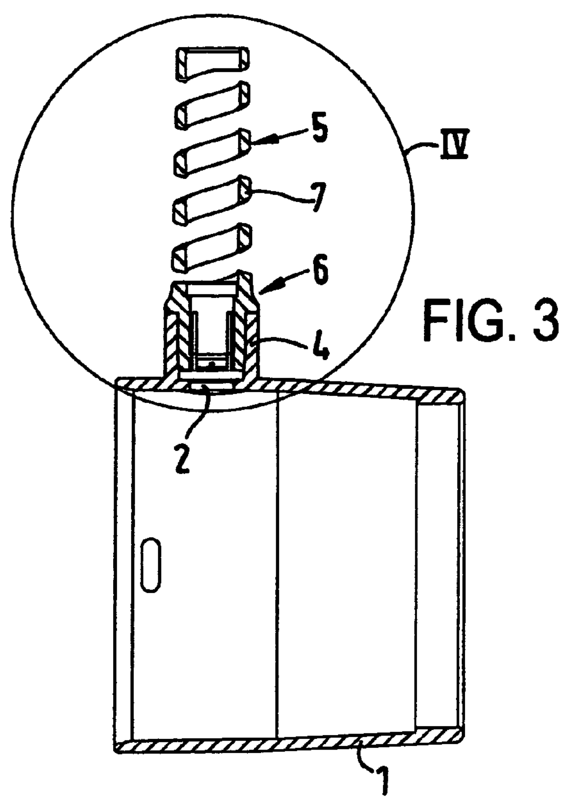
FIG. 3 shows a longitudinal sectional view of the connecting sleeve with mounted kink protector, without the line.
Figure 5:
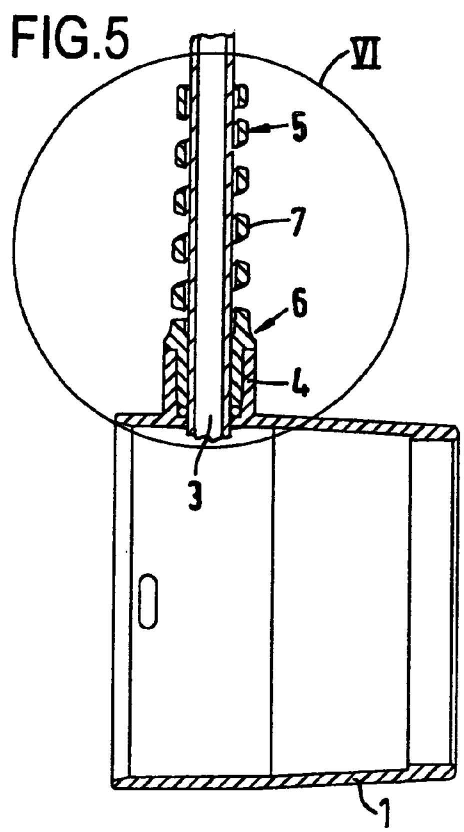
FIG. 5 shows a longitudinal sectional view, which is similar to FIG. 3, of the connecting sleeve with mounted kink protector and line illustrated broken away and not broken away respectively.
Figure 4:
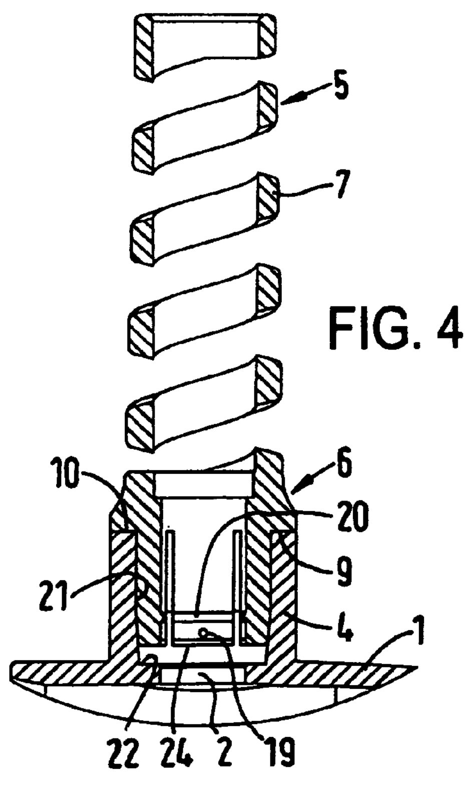
FIG. 4 shows a sectional detail, which is illustrated broken away and to enlarged scale, in correspondence with the detail circle IV in FIG. 3.
Figure 6:
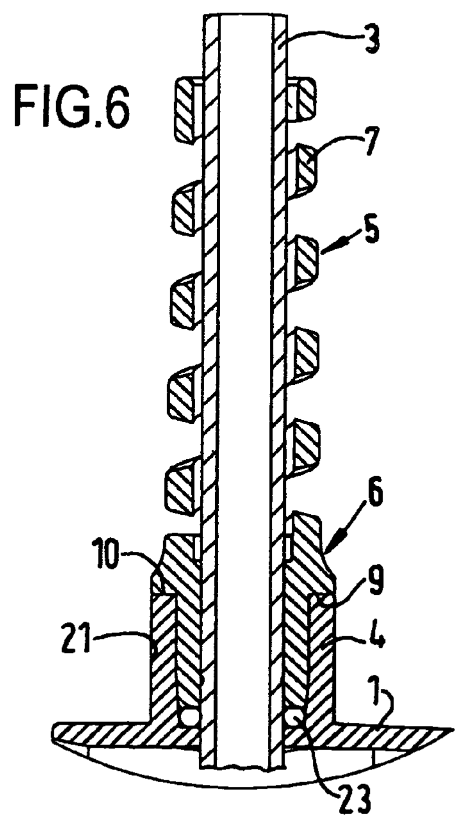
FIG. 6 shows a sectional detail, which is illustrated broken away and to enlarged scale, in correspondence with the detail circle VI in FIG. 5.

The outlet stub 4 has a substantially cylindrical inner wall surface 21, the diameter of which is greater than the diameter of the wall opening 2, as apparent from, for example, FIG. 4. In addition, the inner wall surface 21 has a greater axial length than the clamping section 8 of the mounting cap 6. An annular step 22, on which a sealing ring 23 can be placed as evident from FIGS. 2, 5 and 6, is thereby formed between the wall opening 2 and the inner wall surface 21. This sealing ring 23, which is constructed as an O-ring, surrounds the line 3 and is loaded with pressing pressure by the end surface 24 of the clamping section 8, which is completely pushed into the outlet stub and detented therein, of the mounting cap 6. The end surface 24 is divided by the axial slots 11 into four parts as evident from, for example, FIG. 12.

Other variations and modifications are possible without departing from the scope and spirit of the present invention as defined by the appended claims.

We claim:

1. A kink protector for a line which is led outwardly through a wall opening in a connecting sleeve of a hose or a pipe, the kink protector comprising:

a mounting cap which encloses the line;

a support helix which is integral with the mounting cap and surrounds the line and which is resilient in bending; and an outlet stub which is provided at the connecting sleeve, and is connected with the wall opening; a first detent mechanism operable between the outlet stub and mounting cap; a clamping section operable between the mounting cap and line such that the mounting cap can be pushed in an axial direction to both axially fix the mounting cap to the outlet stub and axially fix the line within the mounting cap at the same time.

2. A kink protector according to claim 1, wherein the outlet stub is constructed to have the shape of a section of a tube and has an outer annular end surface which bears by a corresponding abutment surface against the mounting cap, which is pushed into the outlet stub by the clamping section.

3. A kink protector according to claim 1, wherein the outlet stub is constructed to have the shape of a section of a tube and has an outer annular end surface which bears by a corresponding abutment surface against the mounting cap, which is pushed into the outlet stub by the clamping section; and wherein the clamping section of the mounting cap comprising; starting from the abutment surface, at least two part elements, which are spaced apart by axially extending slots and of which at least one is, when the line is pushed in, resiliently bendable outwardly and, when the clamping section is pushed into the outlet stub, resiliently bendable inwardly with clamping action against the line.

4. A kink protector according to claim 1, wherein the outlet stub is constructed to have the shape of a section of a tube and has an outer annular end surface which bears by a corresponding abutment surface against the mounting cap, which is pushed into the outlet stub by the clamping section; wherein the clamping section of the mounting cap comprises; starting from the abutment surface, at least two part elements, which are spaced apart by axially extending slots and of which at least one is, when the line is pushed in, resiliently bendable outwardly and, when the clamping section is pushed into the outlet stub, resiliently bendable inwardly with clamping action against the line, and wherein at least one of the part elements of the clamping section has on the outside a detent lug associated with a detent depression in the outlet stub, into which the detent lug enters when the mounting cap bears by its abutment surface on the end surface of the outlet stub.

5. A kink protector according to claim 1, wherein the outlet stub is constructed to have the shape of a section of a tube and has an outer annular end surface which bears by a corresponding abutment surface against the mounting cap, which is pushed into the outlet stub by the clamping section; wherein the clamping section of the mounting cap comprising; starting from the abutment surface, at least two part elements, which are spaced apart by axially extending slots and of which at least one is, when the line is pushed in, resiliently bendable outwardly and, when the clamping section is pushed into the outlet stub, resiliently bendable inwardly with clamping action against the line; wherein at least one of the part elements of the clamping section has on the outside a detent lug associated with a detent depression in the outlet stub, into which the detent lug enters when the mounting cap bears by its abutment surface on the end surface of the outlet stub; and wherein the detent depression in the outlet stub is formed as a wall opening of the outlet stub, which receives the detent lug in complementary manner, so that the mounting cap is not only axially fixed in the outlet stub, but also secured against rotations of the mounting cap in the outlet stub.

6. A kink protector according to claim 1, wherein the outlet stub is constructed to have the shape of a section of a tube and has an outer annular end surface which bears by a corresponding abutment surface against the mounting cap, which is pushed into the outlet stub by the clamping section; wherein the clamping section of the mounting cap comprises; starting from the abutment surface, at least two part elements, which are spaced apart by axially extending slots and of which at least one is, when the line is pushed in, resiliently bendable outwardly and, when the clamping section is pushed into the outlet stub, resiliently bendable inwardly with clamping action against the line; wherein at least one of the part elements of the clamping section has on the outside a detent lug associated with a detent depression in the outlet stub, into which the detent lug enters when the mounting cap bears by its abutment surface on the end surface of the outlet stub; and wherein the detent depression in the outlet stub is formed as an annular groove receiving the detent lug so that the mounting cap is only axially fixed in the outlet stub and is not secured against rotations of the mounting cap in the outlet stub.

7. A kink protector according to claim 1, wherein the outlet stub is constructed to have the shape of a section of a tube and has an outer annular end surface which bears by a corresponding abutment surface against the mounting cap, which is pushed into the outlet stub by the clamping section; wherein the clamping section of the mounting cap comprises; starting from the abutment surface, at least two part elements, which are spaced apart by axially extending slots and of which at least one is, when the line is pushed in, resiliently bendable outwardly and, when the clamping section is pushed into the outlet stub, resiliently bendable inwardly with clamping action against the line; and wherein, for preventing rotation of the line in the mounting cap and for axially fixing the line in the mounting cap, the mounting cap is provided with the first detent mechanism which includes an inwardly protruding annular rib and at least one pointed radial projection engaging the line.

8. A kink protector according to claim 1, wherein the outlet stub is constructed to have the shape of a section of a tube and has an outer annular end surface which bears by a corresponding abutment surface against the mounting cap, which is pushed into the outlet stub by the clamping section; wherein the clamping section of the mounting cap comprises; starting from the abutment surface, at least two part elements, which are spaced apart by axially extending slots and of which at least one is, when the line is pushed in, resiliently bendable outwardly and, when the clamping section is pushed into the outlet stub, resiliently bendable inwardly with clamping action against the line; and wherein the clamping section of the mounting cap is of conical construction at its free end.

9. A kink protector according to claim 1, wherein the outlet stub has a substantially cylindrical inner wall surface, the diameter of which is greater than the diameter of the wall opening in the connecting sleeve so that there is formed between the wall opening and the inner wall surface an annular step on which is placed a sealing ring, which surrounds the line and which is loaded with pressing pressure by the end surface of the mounting cap completely pushed into the outlet stub and detented therein.

* * * * *